(12) United States Patent
Andrews et al.

(10) Patent No.: US 12,519,631 B2
(45) Date of Patent: *Jan. 6, 2026

(54) OUT OF BAND KEY EXCHANGE

(71) Applicant: SCATR CORP, Sheridan, WY (US)

(72) Inventors: John G. Andrews, Cleveland Heights, OH (US); John P. Keyerleber, Richmond Heights, OH (US)

(73) Assignee: SCATR CORP

( * ) Notice: Subject to any disclaimer, the term of this patent is extended or adjusted under 35 U.S.C. 154(b) by 115 days.

This patent is subject to a terminal disclaimer.

(21) Appl. No.: 18/345,819

(22) Filed: Jun. 30, 2023

(65) Prior Publication Data

US 2025/0007707 A1    Jan. 2, 2025

(51) Int. Cl.
*H04L 9/08* (2006.01)

(52) U.S. Cl.
CPC ............ *H04L 9/088* (2013.01); *H04L 9/0861* (2013.01)

(58) Field of Classification Search
CPC .............................. H04L 9/088; H04L 9/0861
See application file for complete search history.

(56) References Cited

U.S. PATENT DOCUMENTS

| | | |
|---|---|---|
| 6,502,135 B1 | 12/2002 | Munger et al. |
| 6,765,866 B1 | 7/2004 | Wyatt |
| 6,990,111 B2 | 1/2006 | Lemoff et al. |
| 7,382,782 B1 | 6/2008 | Ferguson et al. |
| 7,697,528 B2 | 4/2010 | Parry et al. |
| 7,782,782 B1 | 8/2010 | Ferguson et al. |
| 7,895,348 B2 | 2/2011 | Twitchell, Jr. |
| 7,984,495 B1 | 7/2011 | Aravind |
| 8,274,980 B2 | 9/2012 | Sato et al. |
| 8,358,658 B2 | 1/2013 | Flynn et al. |
| 8,416,686 B2 | 4/2013 | Ferguson et al. |
| 8,924,716 B2 | 12/2014 | Miyabayashi et al. |
| 8,955,110 B1 | 2/2015 | Twitchell, Jr. |

(Continued)

FOREIGN PATENT DOCUMENTS

| | | | | |
|---|---|---|---|---|
| CN | 112333152 A | * | 2/2021 | ........... H04L 9/3263 |
| EP | 3651407 A1 | * | 5/2020 | ............ H04W 12/06 |

(Continued)

OTHER PUBLICATIONS

Notice of Allowance dated Jun. 22, 2021, U.S. Appl. No. 16/683,146, filed Nov. 13, 2019.

(Continued)

*Primary Examiner* — Darshan I Dhruv
(74) *Attorney, Agent, or Firm* — Conley Rose, P.C.

(57) ABSTRACT

Examples of the disclosure provide for a scatter network device. In some examples, the scatter network device includes a non-transitory memory, at least one processor, and a key exchange application stored in the non-transitory memory. When executed by the at least one processor, the key exchange application generates a key exchange request, transmits the key exchange request to a first network endpoint via a first communication band, responsive to transmitting the key exchange request, receives a key exchange response, generates a symmetric encryption key based on the key exchange response, and transmits an authenticated message encrypted via the symmetric encryption key to a second network endpoint via a second communication band.

15 Claims, 7 Drawing Sheets

(56) References Cited

U.S. PATENT DOCUMENTS

| | | |
|---|---|---|
| 9,116,734 B1 | 8/2015 | Twitchell, Jr. et al. |
| 9,185,046 B2 | 11/2015 | Ferguson et al. |
| 9,225,699 B2 | 12/2015 | Biradar et al. |
| 9,241,026 B2 | 1/2016 | Twitchell, Jr. |
| 9,495,194 B1 | 11/2016 | Twitchell, Jr. et al. |
| 9,535,805 B2 | 1/2017 | Ananthanarayanan et al. |
| 9,629,063 B2 | 4/2017 | Brown et al. |
| 9,794,797 B2 | 10/2017 | Hoffberg |
| 10,356,061 B2 | 7/2019 | Fiske |
| 10,432,526 B2 | 10/2019 | Gafni et al. |
| 10,469,375 B2 | 11/2019 | Twitchell, Jr. |
| 10,541,907 B2 | 1/2020 | Twitchell, Jr. et al. |
| 10,637,685 B2 | 4/2020 | Goel et al. |
| 10,686,729 B2 | 6/2020 | Sindhu et al. |
| 10,715,327 B1 | 7/2020 | Ramanujan et al. |
| 10,826,711 B2 | 11/2020 | Barry |
| 10,826,876 B1 | 11/2020 | Sinn et al. |
| 10,833,972 B2 | 11/2020 | Vaughan et al. |
| 10,904,367 B2 | 1/2021 | Goel et al. |
| 10,965,586 B2 | 3/2021 | Goel et al. |
| 11,153,276 B1 | 10/2021 | Keyerleber |
| 11,171,934 B2 | 11/2021 | Fiske |
| 11,178,262 B2 | 11/2021 | Goel et al. |
| 11,184,147 B2 | 11/2021 | Ghorbani |
| 11,381,557 B2 | 7/2022 | Kim et al. |
| 11,469,922 B2 | 10/2022 | Goel et al. |
| 11,533,617 B2 | 12/2022 | Mihelich et al. |
| 11,558,422 B2 | 1/2023 | Twitchell, Jr. et al. |
| 11,601,359 B2 | 3/2023 | Goel et al. |
| 11,637,694 B2 | 4/2023 | Islamov |
| 11,777,839 B2 | 10/2023 | Sindhu et al. |
| 11,805,127 B1 * | 10/2023 | Sundar ............... H04L 63/0884 |
| 11,895,015 B1 | 2/2024 | Budhia et al. |
| 12,021,972 B2 | 6/2024 | Wang et al. |
| 12,120,028 B1 | 10/2024 | Andrews et al. |
| 12,335,160 B2 | 6/2025 | Andrews et al. |
| 2001/0050914 A1 | 12/2001 | Akahane et al. |
| 2001/0054158 A1 | 12/2001 | Jarosz |
| 2002/0191797 A1 * | 12/2002 | Perlman ................ H04L 9/088 |
| | | 713/153 |
| 2003/0112755 A1 | 6/2003 | McDysan |
| 2004/0103205 A1 | 5/2004 | Larson et al. |
| 2006/0008082 A1 | 1/2006 | Gluck et al. |
| 2007/0217424 A1 | 9/2007 | Kim et al. |
| 2010/0149988 A1 | 6/2010 | Matsubara et al. |
| 2011/0179136 A1 | 7/2011 | Twitchell, Jr. |
| 2011/0271096 A1 | 11/2011 | Bharrat et al. |
| 2012/0204032 A1 | 8/2012 | Wilkins et al. |
| 2014/0115341 A1 | 4/2014 | Robertson |
| 2015/0326603 A1 | 11/2015 | Deisinger et al. |
| 2015/0350245 A1 | 12/2015 | Twitchell, Jr. et al. |
| 2015/0350246 A1 | 12/2015 | Bergman |
| 2016/0065370 A1 * | 3/2016 | Le Saint ................ H04L 9/321 |
| | | 713/155 |
| 2016/0119291 A1 | 4/2016 | Zollinger et al. |
| 2016/0255054 A1 | 9/2016 | Wan et al. |
| 2017/0019256 A1 * | 1/2017 | Rhelimi ............. H04L 63/0428 |
| 2017/0033925 A1 | 2/2017 | DeNeut et al. |
| 2017/0126626 A1 | 5/2017 | Datta et al. |
| 2017/0149740 A1 | 5/2017 | Mansour et al. |
| 2017/0331794 A1 | 11/2017 | Lokman et al. |
| 2017/0372048 A1 * | 12/2017 | Liu ....................... G06V 10/774 |
| 2018/0316598 A1 | 11/2018 | Twitchell, Jr. |
| 2018/0375663 A1 * | 12/2018 | Le Saint .............. H04L 9/3247 |
| 2019/0014092 A1 | 1/2019 | Malek et al. |
| 2019/0294464 A1 | 9/2019 | Twitchell, Jr. et al. |
| 2019/0373458 A1 | 12/2019 | Dandekar et al. |
| 2020/0014619 A1 | 1/2020 | Shelar et al. |
| 2020/0154272 A1 * | 5/2020 | Uy ........................ H04W 12/08 |
| 2020/0195439 A1 | 6/2020 | Suresh et al. |
| 2020/0211002 A1 | 7/2020 | Steinberg |
| 2020/0213111 A1 * | 7/2020 | Leavy .................. H04L 9/3242 |
| 2020/0213151 A1 | 7/2020 | Srivatsan et al. |
| 2020/0226258 A1 | 7/2020 | Nix |
| 2020/0259640 A1 * | 8/2020 | Leavy .................... H04L 9/0841 |
| 2021/0051146 A1 | 2/2021 | Stolbikov et al. |
| 2021/0105301 A1 | 4/2021 | Anderson et al. |
| 2021/0144004 A1 * | 5/2021 | Gray .................... H04L 9/0891 |
| 2021/0168138 A1 | 6/2021 | Paruchuri |
| 2021/0184854 A1 | 6/2021 | Pizot et al. |
| 2021/0297351 A1 | 9/2021 | Vegesna et al. |
| 2021/0328779 A1 * | 10/2021 | Ruan .................... H04L 9/0825 |
| 2021/0328976 A1 * | 10/2021 | Leavy ...................... H04L 9/14 |
| 2021/0352471 A1 | 11/2021 | Hallock |
| 2021/0360026 A1 | 11/2021 | Anderson et al. |
| 2022/0247678 A1 | 8/2022 | Atwal et al. |
| 2022/0392286 A1 * | 12/2022 | Elrad ............... H04W 12/0471 |
| 2023/0006993 A1 | 1/2023 | Bilgin et al. |
| 2023/0097712 A1 * | 3/2023 | Sullivan ............. H04L 63/1466 |
| | | 713/171 |
| 2023/0164086 A1 | 5/2023 | York et al. |
| 2023/0188347 A1 | 6/2023 | Sarin |
| 2023/0198914 A1 | 6/2023 | Ranjan et al. |
| 2023/0208748 A1 | 6/2023 | Goel et al. |
| 2024/0007367 A1 | 1/2024 | Demchenko |
| 2024/0028367 A1 | 1/2024 | Mathew et al. |
| 2024/0214803 A1 | 6/2024 | Dandekar et al. |
| 2024/0275596 A1 | 8/2024 | Stolbikov et al. |
| 2024/0380726 A1 * | 11/2024 | Ban ..................... H04L 61/2503 |

FOREIGN PATENT DOCUMENTS

| | | | | |
|---|---|---|---|---|
| WO | WO-2018160863 A1 * | 9/2018 | ........... | H04L 9/3263 |
| WO | WO-2023134844 A1 * | 7/2023 | ........... | H04W 12/06 |

OTHER PUBLICATIONS

Office Action dated Apr. 12, 2023, U.S. Appl. No. 17/481,914, filed Sep. 22, 2022.

Final Office Action dated Jul. 24, 2023, U.S. Appl. No. 17/481,914, filed Sep. 22, 2022.

Keyerleber, John P., et al., "Secure Data Routing and Randomization," filed Sep. 22, 2021, U.S. Appl. No. 17/481,914.

Andrews, John G., et al., "Secure Data Routing With Channel Resiliency," filed Mar. 31, 2023, U.S. Appl. No. 18/194,413.

Andrews, John G., et al., "Network Traffic Obfuscation," filed Jun. 30, 2023, U.S. Appl. No. 18/345,829.

Andrews, John G., et al., "Endpoint Validation Security," filed Jun. 30, 2023, U.S. Appl. No. 18/345,837.

Andrews, John G., et al., "Secure Data Routing With Dynamic Packet Spoofing ," filed Jun. 30, 2023, U.S. Appl. No. 18/345,847.

"Andrews, John G., et al., ""Secure Data Routing Andrandomization in Windows,"" filed Jul. 28, 2023, U.S. Appl. No. 18/361,721."

Notice of Allowance dated Jun. 11, 2024, U.S. Appl. No. 18/194,413, filed Mar. 31, 2023.

Office Action dated Nov. 27, 2024, U.S. Appl. No. 18/345,829, filed Jun. 30, 2023.

Syed, et al., "Zero Trust Architecture (ZTA): A Comprehensive Survey", IEEE Access—Digital Object Identifier, vol. 10, 37 pages, 2022.

Shu, et al., "Secure Data Collection in Wireless Sensor Networks Using Randomized Dispersive Routes", IEEE Transactions on Mobile Computing, vol. 9, No. 7, Jul. 2010, 14 pages.

Andrews, John G., et al., "Secure Data Routing With Channel Resiliency," filed Sep. 11, 2024, U.S. Appl. No. 11/882,552.

Advisory Action dated Oct. 5, 2023, U.S. Appl. No. 17/481,914, filed Sep. 22, 2022.

Examiner's Answer to Appeal Brief dated Feb. 23, 2024, U.S. Appl. No. 17/481,914, filed Sep. 22, 2022.

Office Action dated Feb. 13, 2024, U.S. Appl. No. 18/194,413, filed Mar. 31, 2023.

Keyerleber, John P., "Machine Learning Driven Network Traffic Obfuscation," filed Jan. 24, 2024, U.S. Appl. No. 18/421,960.

Keyerleber, et al., "Optimizing Network Traffic Obfuscation Based On Network Performance Using Reinforcement Learning," filed Jan. 24, 2024, U.S. Appl. No. 18/421,965.

Keyerleber, et al., "Optimizing Network Traffic Obfuscation Based On Aggregated Network Performance," filed Jan. 24, 2024, Application No. Jan. 24, 2024.

(56) References Cited

OTHER PUBLICATIONS

Notice of Allowance dated May 20, 2025, U.S. Appl. No. 18/345,829, filed Jun. 30, 2023.
Office Action dated Jul. 11, 2025, U.S. Appl. No. 18/345,837, filed Jun. 30, 2023.
Notice of Allowance dated Feb. 21, 2025, U.S. Appl. No. 18/345,847, filed Jun. 30, 2023.
Office Action dated Apr. 23, 2025, U.S. Appl. No. 18/361,721, filed Jul. 28, 2023.
Notice of Allowance dated Dec. 9, 2025, U.S. Appl. No. 18/361,721, filed Jul. 28, 2023.
Notice of Allowance dated Oct. 27, 2025, U.S. Appl. No. 18/345,837, filed Jun. 30, 2023.
Decision on Appeal dated Nov. 18, 2025, U.S. Appl. No. 17/481,914, filed Sep. 22, 2022.

* cited by examiner

OUT OF BAND KEY EXCHANGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data transmitted between two computing systems may travel via defined paths or routes, through any of a variety of publicly accessible networks (e.g., the Internet), and may use any of a variety of media, such as Ethernet or fiber cabling. In known methods of data transmission across networks, data routing is performed based on an external Internet protocol (IP) address. Data packets are generally forwarded across multiple routers to the requested IP address by the fastest path available at the time of transmission, with the packet's destination visible upon inspection.

Whenever data is moved between two points, there is a potential risk of unauthorized access to that data by an eavesdropper or other unauthorized actor. Conventional techniques to secure the transmission of confidential information typically rely upon data being encrypted by a sufficiently complex single encryption algorithm. For example, a virtual private network (VPN) establishes a virtual point-to-point connection (e.g., a so-called "secure tunnel") in which data is encrypted when it leaves one location and is decrypted at its destination, where both source and destination are identified by unique, attributable IP addresses. Any intermediate stops (hops, nodes, etc.) are also identifiable by their assigned IP address.

In the scenario above, two types of unauthorized users may attempt to access the transmitted data. First, an unauthorized user with access to an applicable encryption key (e.g., an employee of the source client that generated the data or a knowledgeable malicious actor) could observe the transmission and be able to decrypt and read the entirety of the communication. Next, an unauthorized user with no access to the applicable encryption key (e.g., an eavesdropper) may not be able to read the actual content of a communication, but may still be able to derive relevant information about the data transmission merely from observation, such as one or more of its destination, its source, its intermediate hops, the relative size (number of packets) of the transmission, the transmission type (e.g., based on destination port), and the like. Either of these bad actors could observe, capture, manipulate, divert, and/or log information about these types of transmissions. What is more, even with respect to an eavesdropper that does not have an encryption key, the actual content of a transmission may not be safe, as it is possible that a previously-accessed encrypted transmission may later become accessible. As computing resources improve, increasingly complex methods of encryption are subject to being "cracked" or broken, rendering such encryption useless. Once the encryption algorithm is broken, a hacker may be able to read unauthorized data that they previously obtained and stored.

SUMMARY

In some examples, a scatter network device includes a non-transitory memory, at least one processor, and a key exchange application stored in the non-transitory memory. When executed by the at least one processor, the key exchange application generates a key exchange request, transmits the key exchange request to a first network endpoint via a first communication band, responsive to transmitting the key exchange request, receives a key exchange response, generates a symmetric encryption key based on the key exchange response, and transmits an authenticated message encrypted via the symmetric encryption key to a second network endpoint via a second communication band.

In some examples, a method of secure data routing includes receiving, at a first network endpoint, a key exchange request from a client device, the key exchange request including an identifier of the client device and an ephemeral public encryption key of the client device. The method also includes decrypting the key exchange request according to a private encryption key of the first network endpoint. The method also includes generating a key exchange response, the key exchange response including an ephemeral public encryption key of the first network endpoint and encrypted according to the ephemeral public encryption key of the client device. The method also includes transmitting, to the client device, the key exchange response. The method also includes generating a shared encryption key based on the private encryption key of the first network endpoint and the ephemeral public encryption key of the client. The method also includes storing the shared encryption key with an association to the identifier of the client device in a data store. The method also includes receiving, at a second network endpoint, a symmetrically encrypted authenticated message from the client device. The method also includes decrypting the authenticated message according to the shared encryption key.

In some examples, a computing device includes a non-transitory memory, at least one processor, and a key exchange application stored in the non-transitory memory. When executed by the at least one processor, the key exchange application receives an asymmetrically encrypted key exchange request from a client device, the key exchange request including an identifier of the client device and encrypted according to a static public key of the computing device, decrypts the key exchange request according to a private encryption key of the computing device to obtain the identifier of the client device; transmits an asymmetrically encrypted key exchange response to the client device, the key exchange response encrypted according to a static public key of the client device, and generates a symmetric encryption key according to the ephemeral public key of the client device and a private key of the computing device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
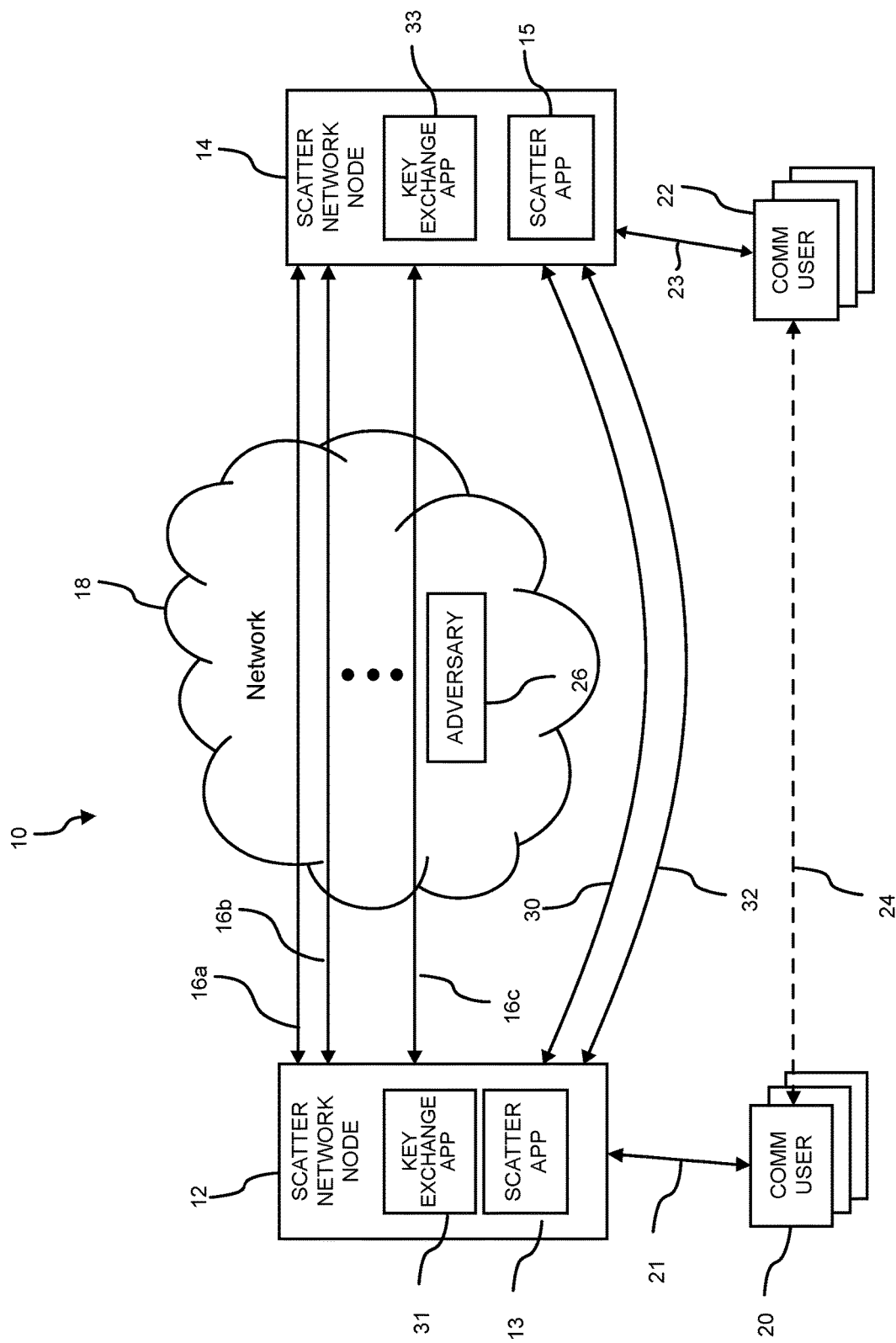
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a variety of elaborations and extensions of scatter networking technology. Communication between a source and a destination via the Internet or other communication network may be scattered by a collaborating pair of scatter network nodes. The source may be a first user device such as a mobile phone or a laptop computer; the destination may be a second user device such as a mobile phone or a laptop computer. Alternatively, the source may be the first user device and the destination may be a server application such as a social networking application executing on computer system or in a cloud computing environment or a financial services application executing on a computer system or in a cloud computing environment. For further details of scattering network communications, see U.S. Pat. No. 11,153,276 B1 issued Oct. 19, 2021, titled "Secure Data Routing and Randomizing" by John P. Keyerleber, and U.S. patent application Ser. No. 18/194,413, filed Mar. 31, 2023, titled "Secure Data Routing and Randomizing with Channel Resiliency" by John G. Andrews, et al., which is hereby incorporated by reference herein in its entirety.

In some embodiments, an unauthorized user may make inferences, determine correlations, or otherwise glean meaningful information from the encrypted VPN data traffic without decrypting the data traffic. For example, the unauthorized user may glean meaningful information from unencrypted information included in a data packet that includes an encrypted payload, or from patterns of the encrypted information. In some embodiments, the unauthorized user even learning that a user is communicating encrypted information may be undesirable to the user.

Because, the mere knowledge by an unauthorized party that a user is transmitting or receiving encrypted information may be undesirable to the user, even without the unauthorized party learning the content of the encrypted information, the VPN data traffic may be implemented as a padded uniform random blob (PURB), or data packets that are indistinguishable from random noise. In this way, the VPN data traffic may be concealed within a more ubiquitous cover protocol, such as non-encrypted hypertext transfer protocol (HTTP) data traffic, an image, or the like. Generally, implementing the VPN data traffic as a PURB may facilitate steganography with respect to the VPN data traffic. In some embodiments, a payload of the VPN data traffic may be implemented as a PURB.

Implementing the payload of the VPN data traffic as a PURB may render metadata data of the VPN data traffic indiscernible from payload data of the VPN data traffic without decryption. This may introduce performance considerations to encryption types, creating categories of messages based on their encryption. First, symmetric encryption may be suitable for high-bandwidth applications, such as video or audio streaming. Symmetric encryption is performed when encrypting and decrypting parties use encryption keys that have the same content (e.g., a shared key). Second, asymmetric encryption may be suitable for the generation of shared keys, but generally may not be suitable for high-bandwidth applications resulting from increased processing involved in encrypting or decrypting data based on asymmetric encryption. Asymmetric encryption is performed when encrypting and decrypting parties use encryption keys that have different content.

In examples in which plaintext metadata is available to signal whether a payload is symmetrically or asymmetrically encrypted, a device may efficiently decrypt both types of messages. However, in the implementation described above in which the VPN data traffic is indistinguishable from random noise, a receiving device may be unaware as to whether a received data packet is symmetrically or asymmetrically encrypted. As a result, symmetrically encrypted data (e.g., encrypted VPN data traffic) may be transmitted in a different band than asymmetrically encrypted data (e.g., a static public key or some other identifier for use in encrypting the VPN data traffic).

For example, transport of the encrypted VPN data traffic may be performed in a separate, or unrelated band from transport of information (e.g., a public encryption key) for encrypting or decrypting the data traffic. For instance, a public encryption key, identifier, or other information for use in encrypting and decrypting information transmitted via a VPN may be transmitted in a first data band for use in establishing the VPN. This may be referred to as an out of band key exchange. Subsequently, data traffic in the VPN, encrypted based on information exchanged in the out of band key exchange, may be transmitted via a second data band that is separate from the first data band. After establishing the VPN based on an initial out of band key exchange, subsequent key exchanges may be performed in-band in the second data band in which the encrypted VPN data traffic is transmitted. In some embodiments, such a process of out of band key exchange may prevent or mitigate an ability for an unauthorized user to observe or intercept both communication of the encryption key as well as communication of subsequently encrypted data traffic. Preventing the unauthorized user from observing or intercepting both communication of the encryption key as well as communication of subsequently encrypted data traffic may mitigate an ability for the unauthorized user to decrypt or otherwise break the encryption of the data traffic based on the encryption key. The out of band key exchange may also facilitate the use of both asymmetric encryption in the first data band and symmetric encryption in the second data band. In some embodiments, a user device may communicate with a first server, device, or network endpoint via the first data band and may communicate with a second server, device, or network endpoint via the second data band. In some embodiments, the first server, device, or network endpoint may be configured for asymmetric decryption and the second server, device, or network endpoint may be configured for symmetric decryption.

As used here, a data band may be a physical interface. Different physical interfaces may include one or more WiFi physical interfaces, one or more Bluetooth physical interfaces, one or more long-term evolution (LTE) physical interfaces, one or more 5G wireless physical interfaces, one or more wireless local area network (WLAN) physical interfaces, one or more Ethernet physical interfaces, and/or one or more satellite wireless physical interfaces (wireless interfaces linking to satellites located in space-either low earth orbit (LEO) satellites, geosynchronous satellites, or other satellites). Different physical interfaces may also include Internet Protocol 6 Over Low-Power Wireless Personal Area Networks (6LoWPAN), Bluetooth Low Energy (BLE), global system for mobile communications (GSM), LoRa, LTE-M, LTE-MTC, Narrowband IoT (NB-IoT), near field communication (NFC), WiFi Direct, Z-Wave, and/or Zigbee wireless physical interfaces. Examples of data bands also include short message service (SMS), mobile subscriber identity module (SIM) management messages, such as unstructured supplementary service data (USSD) or USSD simulation service in IP multimedia subsystem (IMS) (USSI), etc.

Similarly, in implementations as described above in which the VPN data traffic is indistinguishable from random noise, a receiving device may face challenges in determining a source of the received communication, prior to decryption. For example, the receiving device may be unaware as to whether communication has been received from a client that is authorized, or from an unauthorized party. In some embodiments, a server side device may provide endpoint validation tokens (EVTs) to a client device during a key exchange. The key exchange may be the out of band key exchange described above, or may be a subsequent in-band key exchange performed after a VPN has been established according to the out of band key exchange. In some embodiments, a server or other device performing a key exchange with a client may provide the client with one or more EVTs. For example, the server may provide the client with multiple EVTs, where the client rotates between or among the EVTs at programmed time intervals. The client may include one of the EVTs in a first data message transmitted to the server to identify the client to the server. In some embodiments, the client appends the EVT to the beginning or to the end of a payload. In other examples, the client inserts the EVT into the payload at a programmed location that is somewhere between the first and last bits of the payload. In this way, the server may decrypt the received EVT and authenticate the client efficiently.

Turning now to FIG. 1A, a communication system 10 is described. In an embodiment, the system 10 comprises a first scatter network node 12 that executes a first scattering application 13 and a second scatter network node 14 that executes a second scattering application 15. In an embodiment, the first scattering application 13 is a first instance and the second scattering application 15 is a second instance of the same scattering application. In another embodiment, however, the first scattering application 13 may be different from the second scattering application 15, for example the first scattering application 13 may be configured to play a client role while the second scattering application 15 may be configured to play a server role.

The scatter network node 12 and the scatter network node 14 may each be implemented as separate computer systems, for example server computers. Computer systems are described further hereinafter. One or both of the scatter network nodes 12, 14 may be implemented as a smart phone, a wearable computer, a headset computer, a laptop computer, a tablet computer, a notebook computer, or an Internet of Things (IoT) device having at least some functionality of a computer. One of the scatter network nodes 12, 14 may be implemented as one or more virtual servers executing in a cloud computing environment.

The scattering applications 13, 15 comprise executable logic instructions that comprise scripts, compile high-level language code, assemble language instructions, and/or interpret language code. The scattering applications 13, 15 may be provided as shell scripts, compiled C language code, compiled C++ language code, JAVA code, and/or some other kind of logic instructions. In an embodiment, compiled C language code is used to implement the logic instructions of the scattering applications 13, 15 and provides access to operating system calls and greater control of the operations on the scatter network nodes 12, 14 than scripts may provide. The scattering applications 13, 15 may also comprise data such as configuration data and/or provisioning data, for example provisioning data that defines logical communication channels, associations of user devices to logical communication channels, instructions for forming encryption keys, such as asymmetric encryption keys, an ephemeral key, a private key, or the like, and instructions for performing a key exchange.

In an embodiment, the scatter network nodes 12, 14 collaborate with each other to establish a plurality of logical communication channels 16 by which they communicate with each other via a network 18. The network 18 may comprise one or more private networks, one or more public networks, or a combination thereof. In an embodiment, the network 18 comprises the Internet. FIG. 1A shows a first logical communication channel 16a, a second logical communication channel 16b, and a third logical communication channel 16c, but it is understood that the scatter network nodes 12, 14 may establish any number of logical communication channels 16, for example 2, 3, 4, 5, 6, 7, 8, 9, 10, 15, 16, 20, 25, 27, 30, 32, 64, 138, 256, 1024, 4096, or some other number of logical communication channels 16 less than 2 million logical communication channels.

Each logical communication channel 16 may comprise a data communication link that may be considered as an IP communication path. Each logical communication channel 16 is bidirectional such that data packets may flow from the first scatter network node 12 to the second scatter network node 14 via the logical communication channels 16, and data packets may flow from the second scatter network node 14 to the first scatter network node 12 via the logical communication channels 16. Each logical communication channel 16 may pass through various network nodes within the network 18. As discussed further hereinafter, some of the network nodes that the logical communication channels 16 pass through may include simple scatter relays and/or advanced scatter relays. The data communication passing from the first scatter network node 12 to the second scatter network node 14 or vice versa from the second scatter network node 14 to the first scatter network node 12 is treated within the network 18 as IP datagrams.

In an embodiment, the communication between the first scatter network node 12 and the second scatter network node 14 is encrypted. For example, a data portion of an application datagram encapsulated in a data portion of the IP datagrams may be encrypted. For example, a data portion of an application datagram and selected parts of a header portion of the application datagram encapsulated in the data portion of the IP datagrams may be encrypted. In some embodiments, the encryption may cause the encrypted portions of the communication to take on a pseudorandom appearance such that the encrypted portions of the communication may be indistinguishable from random noise. In some embodiments, the encryption may cause the encrypted portions of the communication to become, or be formatted as, a PURB, as described above.

In an embodiment, the communication between the first scatter network node 12 and the second scatter network node 14 may be considered to flow over a VPN. In some contexts, the scatter network nodes 12, 14 may be said to establish a scatter network via the logical communication channels 16.

A first communication user device 20 may establish a first local communication link 21 with the first scatter network node 12. A second communication user device 22 may establish a second local communication link 23 with the second scatter network node 14. The communication user devices 20, 22 may desire to communicate with each other via an application layer link 24 that is implemented via the scatter network nodes 12, 14 that provide network layer communication links (IP datagram traffic) via the network 18. Note that the dotted line 24 indicates that the application layer link 24 is conceptual in nature and that the actual communication path between the communication user devices 20, 22 passes through the scatter network nodes 12, 14 and the network 18. The first and second local communication links 21, 23 may be insecure and may not carry encrypted data packets. For example, the IP datagrams sent by the first communication user device 20 may designate the true IP address of the first communication user device 20, and the IP datagrams sent by the second communication user device 22 may designate the true IP address of the second communication user device 22. It is undesirable to send IP datagrams that include the true IP addresses of communication user devices 20, 22 via the network 18 because an adversary system 26 may be sniffing or otherwise monitoring the data traffic in the network 18 and identify these user devices 20, 22. The scatter network nodes 12, 14 hide the true IP addresses of the communication user devices 20, 22.

To establish a communication link with a scatter node, a key exchange is performed between the scatter network nodes. The key exchange may be performed out of band. For example, the first scatter network node 12 may establish a first out of band link 30 with the second scatter network node 14, such as between the key exchange application 31 and the key exchange application 33. In some examples, the first scatter network node 12 may establish a second out of band link 32 with the second scatter network node 14. In other examples, the second scatter network node 14 may establish the second out of band link 32 with the first scatter network node 12. Although shown as outside the network 18, in some examples one or both of the first out of band link 30 and/or the second out of band link 32 may traverse the network 18 while remaining separate and distinct from the logical communication channels 16. In some examples, the adversary system 26 may be unaware of, or unable to monitor or intercept key exchange information performed via the first out of band link 30 and/or the second out of band link 32 between the first scatter network node 12 and the second scatter network node 14. However, even if the adversary system 26 intercepts the key exchange information performed via the first out of band link 30 and/or the second out of band link 32, because the key exchange information is performed out of band (e.g., not via the logical communication channels 16), the adversary system 26 may lack sufficient information to correlate that key exchange information to communication of the first scatter network node 12 or the second scatter network node 14 performed via the logical communication channels 16.

As an element of the key exchange, the key exchange application 33 may provide EVTs to the first scatter network node 12. Each EVT may be a one time use identifier that uniquely identifies a sending device to a receiving device, enabling the receiving device to efficiently authenticate the sending device.

Figure 1B:
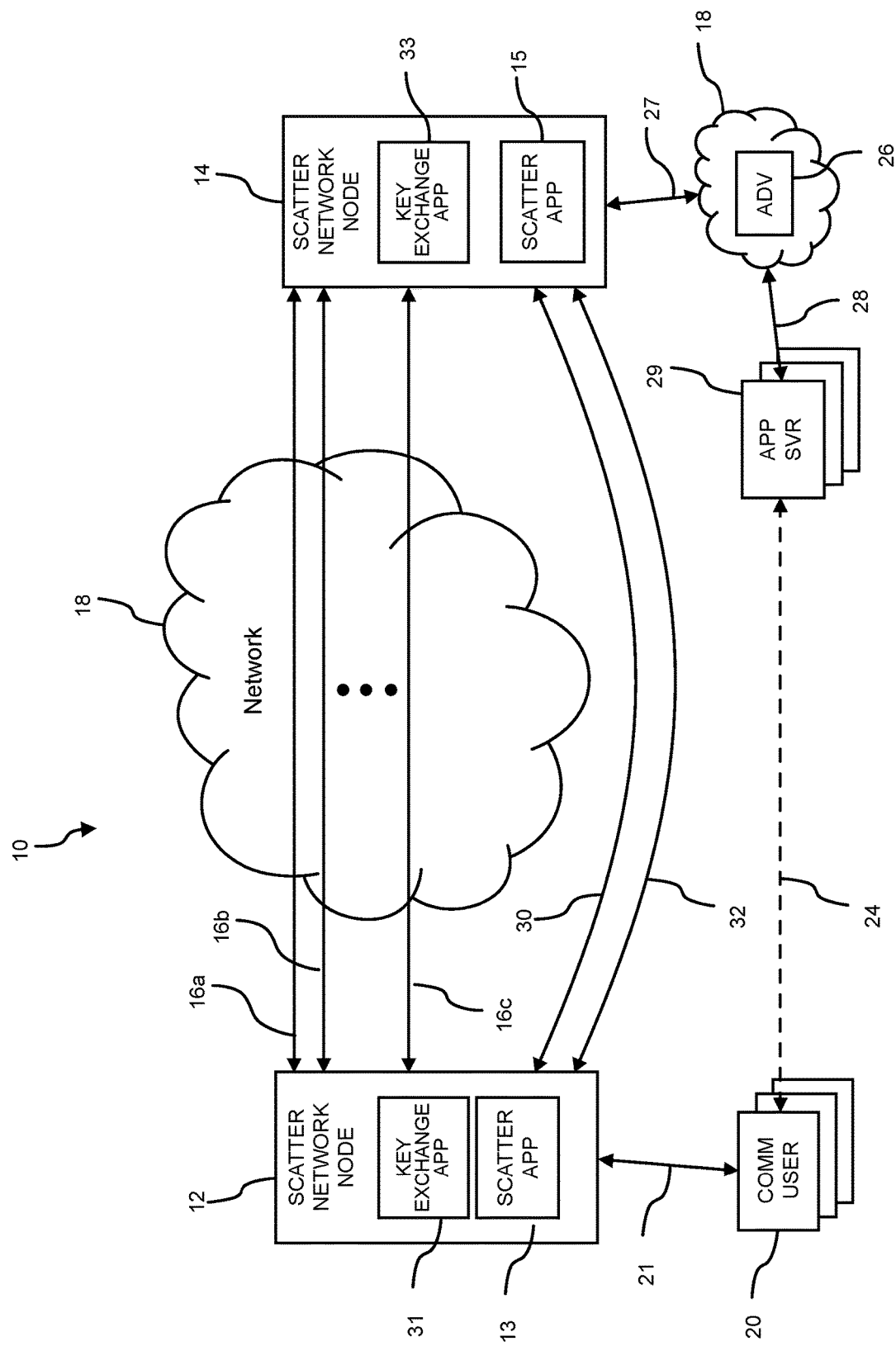
FIG. 1B is another block diagram of the communication system according to an embodiment of the disclosure.

Turning now to FIG. 1B, an alternate view of the communication system 10 is described. The communication functionality provided by the scatter network nodes 12, 14 is general and applies to other communication scenarios than that illustrated and described with reference to FIG. 1A. Note that the network 18 is shown as two cloud images in FIG. 1B but these two clouds conceptually refer to the same network. It is illustrated in FIG. 1B to facilitate understanding of flow of communications. In FIG. 1B, the communicating end users may be considered to be the first communication user device 20 and an application server 29. Thus, the first communication user device 20 may communicate with the application server 29 via an application layer communication link 24 that is conceptual in nature. The first communication user device 20 may request content from and receive content from the application server 29 or send content to the application server 29 conceptually over the application layer communication link 24 but in fact via the first communication link 21, via the logical communication channels 16, via a third communication link 27 to the network 18, and from the network 18 via a fourth communication link 28 to the application server 29. It will be appreciated that the network 18 through which the logical communication channels 16 route is the same network 18 through which the second scatter network node 14 communicates with the application server 29 via communication links 27, 28, drawn separately here to support further understanding of the system 10.

As illustrated in FIG. 1B, the adversary 26 may be located so as to monitor communication between the network 18 and the application server 29. The adversary 26 may determine the true IP addresses of a communication port of the second scatter network node 14 and a communication port of the application server 29. Importantly, however, the adversary 26 is not able to determine the true IP address of the first scatter network node 12 or of the first communication user device 20, hence the adversary 26 is not readily able to determine an approximate location of the first communication user device 20 and/or of the first scatter network node 12. As described above with respect to FIG. 1A, the adversary 26 may be unaware of, or unable to monitor or intercept key exchange information performed via the first out of band link 30 and/or the second out of band link 32 between the first scatter network node 12 and the second scatter network node 14.

With reference now to both FIG. 1A and FIG. 1B, the first logical communication channel 16a may be considered to be defined by an IP address and port number at the first scatter network node 12 and an IP address and port number at the second scatter network node 14. The term port number or port numbers refers to a transport communication layer port number or transport communication layer port numbers and may include well-known port numbers, such as Transmission Communication Protocol (TCP) port numbers or User Datagram Protocol (UDP) port numbers. In an embodiment, the first scatter network node 12 and/or the first scattering application 13 may define sockets to establish the communication ports at its end of the logical communication channels 16, and the second scatter network node 14 and/or the second scattering application 15 may define coordinate sockets to establish the communication ports at its end of the logical communication channels 16. Sockets are a well-known communication abstraction used for conducting data communication between computer systems over the Internet. In an embodiment, the sockets may be UDP type sockets. In an embodiment, the sockets may be TCP type sockets. In an embodiment, a different intermachine communication abstraction may be used to implement the logical communication channels 16.

The first logical communication channel 16a is bidirectional: in a first communication event, the first scatter network node 12 may send an IP datagram via the first logical communication channel 16a to the second scatter network node 14 via the network 18, while in a second communication event, the second scatter network node 14 may send an IP datagram via the first logical communication channel 16a to the first scatter network node 12 via the network 18. The different logical communication channels 16 connect to the first scatter network node 12 at a different combination of IP address, protocol, and port. For example, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and the first port number.

Alternatively, the first logical communication channel 16a may connect to the first scatter network node 12 at a first IP address and first port number; the second logical communication channel 16b may connect to the first scatter network node 12 at the first IP address and a second port number; and the third logical communication channel 16c may connect to the first scatter network node 12 at the first IP address and a third port number. Alternatively, the first logical communication channel 16a may connect to the first scatter network node 12 at a first IP address and first port number; the second logical communication channel 16b may connect to the first scatter network node 12 at a second IP address and the first port number; and the third logical communication channel 16c may connect to the first scatter network node 12 at a third IP address and a second port number. The logical communication channels 16 may attach to the second scatter network node 14 by other combinations of IP address/port number pairs, IP protocols, or the like.

It is noted that a logical communication channel 16 may be defined by any unique combination of: (A) an IP address associated with the first scatter network node 12, (B) a port number at the first scatter network node 12, (C) an IP address associated with the second scatter network node 14, (D) a port number at the second scatter network node 14, and (E) the IP protocol used between the first scatter network node 12 and the second scatter network node 14. Thus, the first logical channel 16a could be defined by a first IP address associated with the first scatter network node 12, a first port number at the first scatter network node 12, a second IP address associated with the second scatter network node 14, and a second port number at the second scatter network node; the second logical channel 16b could be defined by the first IP address associated with the first scatter network node 12, the first port number at the first scatter network node 12, a third IP address associated with the second scatter network node 14, and the second port number at the second scatter network node 14; and the third logical channel 16c could be defined by the first IP address associated with the first scatter network node 12, the first port number at the first scatter network node 12, the second IP address associated with the second scatter network node 14, and a third port number at the second scatter network node 14. These are examples of unique IP addresses and port numbers that uniquely define logical communication channels 16, but it is understood there are many alternative combinations.

The first out of band link 30 and/or second out of band link 32 may be implemented via separate physical interfaces than other logical communication channels or communication links of the communication system 10. For example, the first out of band link 30 and second out of band link 32 are separate and distinct from the logical communication channels 16. As described above, some examples of physical interfaces include WiFi physical interfaces, Bluetooth physical interfaces, LTE physical interfaces, 5G wireless physical interfaces, WLAN physical interfaces, Ethernet physical interfaces, and/or satellite wireless physical interfaces (wireless interfaces linking to satellites located in space-either LEO satellites, geosynchronous satellites, or other satellites). Different physical interfaces may also include LOW-PAN, BLE, GSM, LoRa, LTE-M, LTE-MTC, NB-IoT, NFC, WiFi Direct, Z-Wave, and/or Zigbee wireless physical interfaces. Examples of data bands, or communication protocols that may be utilized in performing out of band key exchange via one or more of the above physical interfaces, include SMS, mobile SIM management messages, such as USSD or USSI, etc. In some embodiments, one or more of the first out of band link 30 and/or second out of band link 32 are implemented via a same physical interface and/or same data band or communication protocol. In other examples, one or more of the first out of band link 30 and/or second out of band link 32 are implemented via different physical interfaces and/or data bands or communication protocols. Additionally, in some examples, the second out of band link 32 does not exist.

In some embodiments, communication via the first out of band link 30 and/or second out of band link 32 may be encrypted via a first encryption type and communication via other logical communication channels or communication links of the communication system 10 may be encrypted via a second encryption type. A component that receives communication may be dedicated to a particular encryption type. For example, an application (such as the key exchange application 31 or the key exchange application 33) or scatter network node may decrypt and encrypt communication transported via out of band links via asynchronous encryption and may decrypt and encrypt communication transported via other logical communication channels or communication links of the communication system 10 via synchronous encryption.

Figure 2:
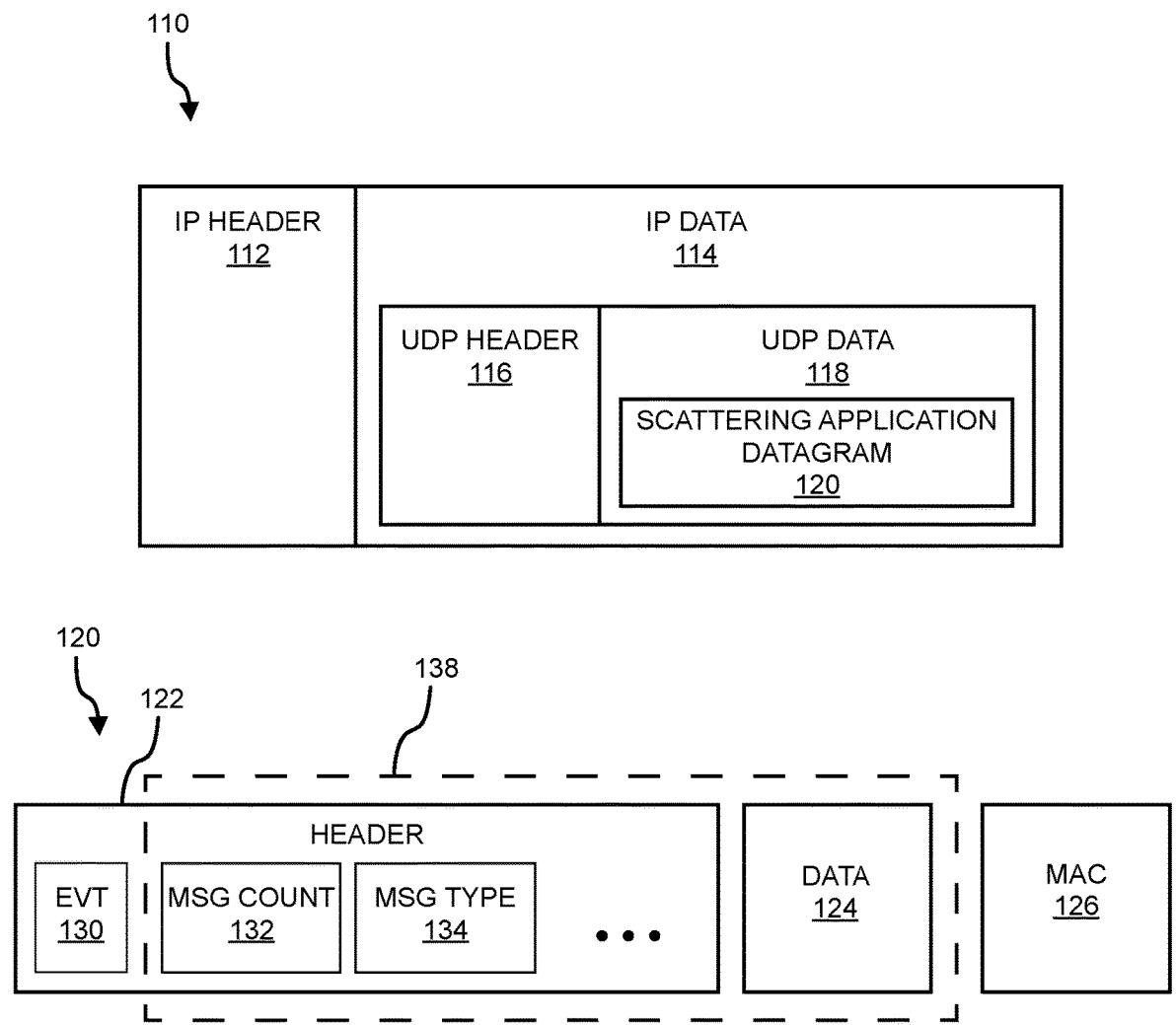
FIG. 2 is a block diagram of a scattering application datagram according to an embodiment of the disclosure.

Turning now to FIG. 2, a scattering application datagram 120 110 is described. In an embodiment, the messages exchanged by scatter network nodes 12, 14 each comprise a scattering application datagram 120. In an embodiment, the scattering application datagram 120 is encapsulated as a UDP data portion 118 of a UDP datagram that also comprises a UDP header 116. The UDP datagram itself is encapsulated in an IP data portion 114 of an IP datagram 110 that also comprises an IP header 112. In another embodiment, the scattering application datagram 120 may be encapsulated in a TCP data portion in a TCP segment, and the TCP segment may be encapsulated in the IP data portion 114 of the IP datagram 110.

In an embodiment, the scattering application datagram 120 comprises a scattering application datagram header 122, a scattering application datagram data portion 124, and a scattering application datagram message authentication code (MAC) 126. Note that the scattering application datagram data portion 124 may be called the scattering application datagram payload, that the UDP data portion 118 may be called the UDP payload, and the IP data portion 114 may be referred to as the IP payload in some contexts. In like manner, a TCP data portion may be referred to as a TCP payload in an embodiment where the TCP transport layer protocol is used instead of the UDP transport layer protocol. In an embodiment, the scattering application datagram header 122 comprises an EVT 130, a message count 132, and a message type 134. It is understood that the scattering application datagram header 122 may comprise additional parameters, for example parameters that contain metadata about the scattering application datagram 120 or the logical communication channels 16.

The scattering application datagram data portion 124 comprises the actual data content that is to be conveyed between the communication user devices 20, 22 or between the first communication user device 20 and the application server 29. In an embodiment, a portion of the scattering application datagram header 122 and all of the scattering application datagram data portion 124 are encrypted in an encrypted portion 138. In some embodiments, the encrypted portion 138 is a PURB. In other examples, the scattering application datagram 120 may be considered a PURB. In some examples, the encrypted portion 138, such as the scattering application datagram data portion 124, may be padded by dummy data to reach a programmed data length, for example, to obfuscate the true nature of the encrypted portion 138, scattering application datagram header 122, the scattering application datagram data portion 124, and/or the scattering application datagram 120. In an embodiment, the message count 132 and the message type 134 parameters of the scattering application datagram header 122 as well as the scattering application datagram data portion 124 are encrypted. It is understood that the positional order of parameters in the scattering application header 122 may be different in different embodiments, although it may be preferred that the EVT 130 be at the front of the scattering application datagram header 122, separate from the encrypted portion 138 of the scattering application datagram 120. In other examples, the EVT 130 may instead be at the end of the scattering application datagram header 122, at some programmed location between the front and the end of the scattering application datagram header 122, or any other suitable location in the scattering application datagram 120.

The EVT 130 uniquely identifies a device (e.g., the scattering network nodes 12, 14) that sends a given scattering application datagram 120 on a logical communication channel 16. The EVT 130 permits the counterpart (e.g., receiving) device to look-up an appropriate decryption key stored in a transitory memory (e.g., random access memory (RAM)) of the counterpart device and decrypt the encrypted portion 138. The scattering application datagram MAC 126 provides a cryptographic checksum that can be used by the counterpart device to determine if the scattering application datagram 120 has been altered. The scattering application datagram MAC 126 may be calculated as a kind of hash or checksum calculated over the encrypted portion 138 based in part on using the selected encryption key. If the scattering application datagram MAC 126 does not match the MAC calculated by the scattering application 13, 15, the entire scattering application datagram 120 may be discarded as corrupted. In this case, the scattering application 13, 15 does not decrypt the encrypted portion 138. The scattering application datagram MAC 126 may be at least 6 bytes long, at least 8 bytes long, at least 10 bytes long, at least 12 bytes long, at least 14 bytes long, at least 16 bytes long, at least 18 bytes long, at least 20 bytes long, at least 22 bytes long, at least 24 bytes long and less than 129 bytes long. In some embodiments, the EVT 130 is selected from among multiple EVTs. For example, in a key exchange process, multiple EVTs may be provided to a device to identify the device. Each EVT may be single use, or may be limited use, such that the device changes EVTs with each new transmission, or after a programmed period of time. The device may obtain additional EVTs responsive to subsequent key exchange requests, such as when renewing an encryption key for encrypting the encrypted portion 138.

The message count 132 is a count of scattering application datagrams 120 sent by a device to a given counterpart device. While shown in FIG. 2 as included in the encrypted portion 138, in some examples the encrypted portion 138 does not include the message count 132, in which case the message count 132 may be unencrypted or may be encrypted separately from the encrypted portion 138. The scattering application 13, 15 may keep a local count value as it sends scattering application datagrams 120 and build this into the message count 132. In an embodiment, the message count 132 may be 4 bytes, 5 bytes, 6 bytes, 7 bytes, 8 bytes, 9 bytes, 10 bytes, 12 bytes, or some other number of bytes less than 24 bytes. As discussed further herein after, the receiving scattering application 13, 15 may use the message count to reorder, de-duplicate, or both, received messages carried in the data portion 124 of the scattering application datagram 120 before forwarding on to the communication user device 20, 22 or to the application server 29. The message type 134 may indicate a type of the message carried in the data portion 124 of the scattering application datagram 120. The message type 134 may indicate that the message is an encryption key rotate command, is a data message (e.g., data relevant to the communication user devices 20, 22 or to the application server 29), or some other type of message.

The scattering applications 13, 15 are preconfigured to associate traffic on the logical communication channels 16 with the communication user devices 20, 22. For example, the first scattering application 13 is preconfigured to associate IP datagrams received on logical communication channels 16 to the first communication user device 20 (e.g., to the true IP address of the first communication user device 20) and to associate IP datagrams addressed to the true IP address of the second communication user device 22 to the logical communication channels 16. For example, the second scattering application 15 is preconfigured to associate IP datagrams received on the logical communication channels 16 to the second communication user device 22 (e.g., to the true IP address of the second communication user device 22) and to associate IP datagrams addressed to the true IP address of the first communication user device 20 to the logical communication channels 16. In other words, the communication user devices 20, 22 communicate in terms of their own true IP addresses, but the scatter network nodes 12, 14 hide these true IP addresses from the network 18 by means of the logical communication channels 16 which do not use the true IP addresses of the communication user devices 20, 22.

The first scatter network node 12 and the second scatter network node 14 may provide a plurality of different physical interfaces which are used to implement the logical communication channels 16, first out of band link 30 and/or second out of band link 32. These different physical interfaces may comprise one or more Ethernet physical interfaces, one or more WLAN physical interfaces, and one or more wireless wide area network (WWAN) physical interfaces, one or more satellite communication physical interfaces. The WLAN physical interfaces may comprise a WiFi physical interface and/or a Bluetooth physical interface. The WWAN physical interfaces may comprise a 6G wireless telecommunication protocol physical interface, a 5G wireless telecommunication protocol physical interface, a LTE wireless telecommunication protocol physical interface, a code division multiple access (CDMA) wireless telecommunication protocol physical interface, and/or a GSM wireless telecommunication protocol physical interface. Different physical interfaces may include 6LoWPAN, Bluetooth, BLE, GSM, LoRa, LTE, LTE-M, LTE-MTC, NB-IoT, NFC, WiFi Direct, Z-Wave, and/or Zigbee wireless physical interfaces. The satellite communication physical interface may comprise an Ethernet-to-satellite physical interface (e.g., a dongle device that uses an Ethernet connector to couple to a computer system and acts as a satellite wireless base station). The physical interfaces provided by the first scatter network node 12 may be different from the physical interfaces provided by the second scatter network node 14. By employing different physical interfaces to implement the logical communication channels 16, channel diversity may be increased and may help to further thwart attempts by the adversary system 26 to eavesdrop or monitor communications between the communication user devices 20, 22. Further, by using different physical interfaces to implement the logical communication channels in comparison to the first out of band link 30 and/or second out of band link 32, computational efficiency is increased resulting from a physical interface employing only one of symmetric encryption or asymmetric encryption and security is enhanced by separating key-exchange information from subsequent data transport, or authenticated message, transmission.

In an embodiment, the scattering applications 13, 15 provide VPN communication functionality over the logical communication channels 16. Unlike some VPN off-the-shelf tools, the VPN communication functionality provided by the scattering applications 13, 15 does not indicate the functionality in their headers. For example, some off-the-shelf VPN tools provide an indication in their headers that a message may be a set-up type of VPN data packet, a key exchange type of VPN data packet, and user data type of VPN data packets. It is undesirable to "tip the hand" of the VPN communication traffic, as this may give an advantage to the adversary system 26, for example allowing them to focus their effort on trying to extract encryption keys from the key exchange type of VPN data packets.

Accordingly, in some embodiments a portion of the scattering application datagram header 122 and all of the scattering application datagram data portion 124 are encrypted as encrypted portion 138 in the form of a PURB. In other examples, the scattering application datagram 120 may be considered a PURB. The PURB is indistinguishable from random noise, and may be padded with dummy data to obfuscate an actual data length of the scattering application datagram header 122, the scattering application datagram data portion 124, and/or the scattering application datagram 120. In some embodiments, encrypting the encrypted portion 138, or the scattering application datagram 120, in the form of a PURB facilitates advanced traffic obfuscation, such as steganography. For example, the scattering application datagram 120, including the encrypted portion 138, may be configured to mimic other types of netflow data traffic, or other data objects. For example, the scattering application datagram 120 may be embedded in an image, a webpage, a status message, an unused field or portion of a field of an unrelated data packet, etc. In this way, the scattering application datagram 120 may blend in with other network communication traffic without tipping the hand or otherwise raising warnings that the scattering application datagram 120 is encrypted or is an element of VPN communication traffic. In this way, the existence of the VPN communication traffic, and indeed the existence of encrypted communication traffic, may be obfuscated, increasing protection from the adversary system 26.

Figure 3:
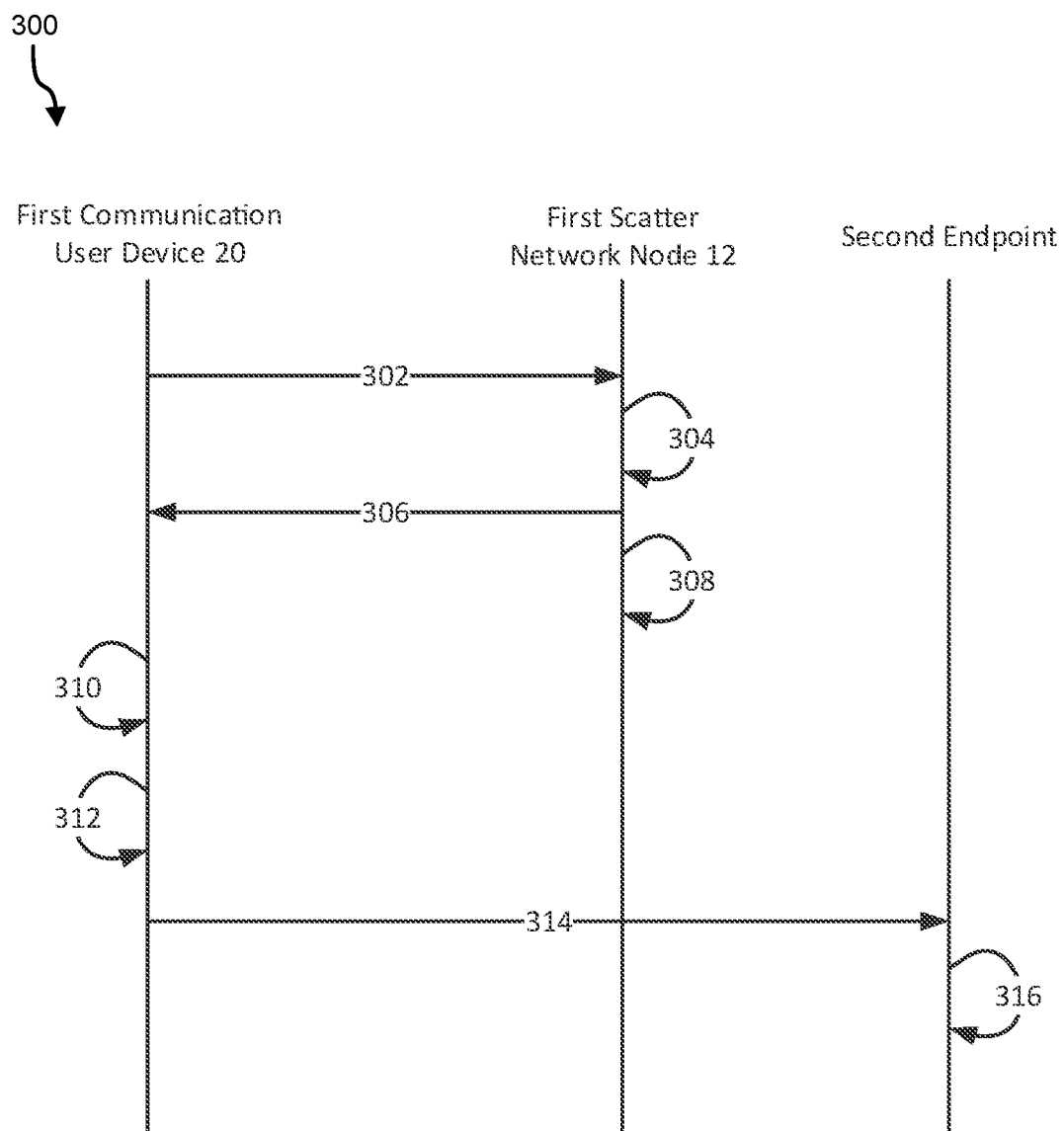
FIG. 3 is a protocol diagram of communication in a communication system according to an embodiment of the disclosure.

Turning now to FIG. 3, a protocol diagram 300 of communication in a communication system such as the communication system 10 is described. The communication is, for example, to establish a secure tunnel between a client and an endpoint. The protocol diagram 300 shows communication between the first scatter network node 12 and the second scatter network node 14.

At operation 302, a client (e.g., the first scatter network node 12) transmits a key exchange request to an endpoint (e.g., the second scatter network node 14). The key exchange request is a request to perform a key exchange to establish a shared secret, or encryption keys, for communicating via a secure tunnel, such as a VPN. In some embodiments, the key exchange request is asynchronously encrypted according to a private key of the client. As such, the endpoint is capable of decrypting the key exchange request via a key (e.g., a private key of the endpoint) different from the private key of the client. In some embodiments, the endpoint, or an application executing on the endpoint, is dedicated to out of band communication. For example, the endpoint, or the particular application executing on the endpoint that handles key exchange requests, may not be involved in data transport for a secure tunnel set up based on the key exchange request. In some embodiments, the key exchange request is small in size in comparison to data transport messages. As a result, the key exchange request may be transmitted via constrained communications channels such as SMS, or physical interfaces, as described above herein, other than those in which data transport is performed.

In some embodiments, payload data of the key exchange request, following encryption, may be indistinguishable from uniform random noise (e.g., the payload data may be a PURB). In some embodiments, at least a portion of header data of the key exchange request may also be encrypted to be indistinguishable from uniform random noise. In some examples, a length of the key exchange request is padded to hide or obfuscate a true length of the key exchange request. In this way, the key exchange request may not include metadata or other identifying or correlatable information that may compromise the client or the endpoint to the adversary system 26. In some examples, the key exchange request is concealed via steganography in other, seemingly innocuous, unrelated communication. For example, the key exchange request may be hidden in an image, hidden in a network maintenance or heartbeat transmission, hidden in an HTTP cookie, hidden in communication unrelated to key exchange in the same, or different, network as subsequent data transport, or the like. In some embodiments, the key exchange request includes at least an ephemeral public key of the client, an identifier of the client, and a MAC, as described above. In some examples, the MAC is generated or formed from the static private key of the client and a static public key of the endpoint. The ephemeral public key is mapped, in some embodiments, to a random string of characters according to Elligator to further obfuscate the ephemeral public key. The identifier of the client may be a static public key of the client, or any other suitable identifier, encrypted with both the ephemeral private key of the client and the static public key of the endpoint. While described at operation 302 as the client transmitting the key exchange request to the endpoint, in various embodiments the key exchange request may transit one or more key exchange relay nodes between the client and the endpoint, such as to obfuscate the endpoint.

At operation 304, the endpoint receives and processes the key exchange request. In some embodiments, the endpoint asymmetrically decrypts the key exchange request according to the static private key of the endpoint to obtain the identifier of the client. The endpoint also receives the MAC. In some embodiments, the endpoint authenticates the key exchange request by comparing the identifier of the client, which may be the static public key of the client, to a database or other data structure including static public keys of authenticated clients.

At operation 306, the endpoint generates a Diffie-Hellman shared secret based on a combination of available static and ephemeral keys for the client and the endpoint. The Diffie-Hellman shared secret may be used to derive a shared encryption key or set of keys for synchronous encryption between the client and another device that has knowledge of the shared secret. For example, the secure tunnel for communication, such as a VPN, may be encrypted according to the shared secret.

At operation 308, responsive to the endpoint determining that the key exchange request is from an authenticated client, the endpoint transmits a key exchange response to the client. In some embodiments, the key exchange response is asynchronously encrypted according to a static private key of the endpoint and the static public key of the client. As such, the client is capable of decrypting the key exchange response via the static private key of the client. The endpoint transmits the key exchange response out of band in a manner similar to the client transmitting the key exchange request out of band. In some examples, the endpoint transmits the key exchange response through a similar physical interface, band, or both, as the key exchange request was transmitted. In other examples, the endpoint transmits the key exchange response through a different physical interface, band, or both, from that in which the key exchange request was transmitted.

In some embodiments, payload data of the key exchange response, following encryption, may be indistinguishable from uniform random noise (e.g., the payload data may be a PURB). In some embodiments, at least a portion of header data of the key exchange response may also be encrypted to be indistinguishable from uniform random. In some examples, a length of the key exchange response is padded to hide or obfuscate a true length of the key exchange response. In this way, the key exchange response may not include metadata or other identifying or correlatable information that may compromise the client or the endpoint to the adversary system 26. In some examples, the key exchange response is concealed via steganography in other, seemingly innocuous, unrelated communication, as described above with respect to the key exchange request. In some embodiments, the key exchange response includes at least an ephemeral public key of the endpoint, a set of EVTs, and a MAC. In some examples, the MAC of the endpoint is generated or formed from the ephemeral public keys and public static keys of the client and the endpoint. In some examples, the EVTs may be formed based on a block cipher encryption of the identifier of the client concatenated with a counter, encrypted based on a non-shared key of the endpoint. Each EVT may be uniquely associated to the client by the endpoint, such as in a data store or other data structure accessible and searchable by the endpoint, and may be one-time use. While described at operation 306 as the endpoint transmitting the key exchange response to the client, in various embodiments the key exchange response may transit one or more key exchange relay nodes between the endpoint and the client, such as to obfuscate the endpoint or the client.

At operation 310, the client receives and processes the key exchange response. In some embodiments, the client asymmetrically decrypts the key exchange response according to a static private key of the client to obtain and store the EVTs. The client also obtains the ephemeral public key of the endpoint and the MAC from the key exchange response. In some embodiments, the client authenticates the key exchange response based on the MAC.

At operation 312, the client generates a Diffie-Hellman shared secret based on a combination of available static and ephemeral keys for the client and the endpoint. In an example, the Diffie-Hellman shared secret generated by the client based on the ephemeral public key of the endpoint and the private key of the client is identical to the Diffie-Hellman shared secret generated by the endpoint based on the ephemeral public key of the client and the private key of the endpoint.

At operation 314, the client transmits a data transport message (which may be generally referred to as an authenticated message) to a second endpoint. In some examples, the second endpoint is selected from a local configuration file of the client. The selection may be random from among a group of endpoints. In other examples, the second endpoint is indicated in the key exchange response, or is selected from among a group of endpoints indicated in the key exchange response. The second endpoint is different from the first endpoint. For example, the second endpoint is a separate application on a server that also includes an application serving as the first endpoint. In another example, the second endpoint is a separate device from the first endpoint. The client transmits the data transport message via a different physical interface or band than the key exchange request. Thus, transmission and receipt of data transport messages may be considered in-band, which is in contrast to the out of band key exchange described herein.

In some examples, the data transport message includes an EVT from among the set of EVTs stored at operation 310. The EVT may be concatenated with a header of the data transport message, either at a beginning or an end of the data transport message, or at any other programmed location in the data transport message. The data transport message may also include a nonce, ciphertext, and the MAC. In some examples, the client encrypts the data transport message, or a portion of the data transport message, such as a payload and a portion of a header, according to the Diffie-Hellman shared secret determined at operation 312. In some examples, the data transport message is encrypted to form a PURB, as described above herein. While described at operation 314 as the client transmitting the data transport message to the second endpoint, in various embodiments the data transport message may transit one or more transport message relay nodes between the client and the second endpoint, such as to obfuscate the second endpoint. The relay nodes may be static or dynamic, such as performing client-based routing according to EVTs.

At operation 316, the second endpoint receives and processes the data transport message. In some embodiments, the second endpoint performs a lookup based on the EVT concatenated to the data transport message to obtain the Diffie-Hellman shared secret determined at operation 308. The second endpoint subsequently symmetrically decrypts the data transport message according to the Diffie-Hellman shared secret obtained from the lookup and authenticates the client based on the MAC, as described above herein. Responsive to authenticating the client, the second endpoint establishes a dedicated client channel, as described above with respect to FIG. 1, to complete formation of the secure tunnel between the client and the second endpoint. In some embodiments, after a channel is established based on a valid EVT, a client need not include another EVT in a data transport message in that channel unless the second endpoint migrates, such as for mobile roaming, NAT rebinding, etc. In some embodiments, the client may include an EVT in a subsequent data transport message to the second endpoint if a programmed duration of time has elapsed since receipt by the client of a message from the second endpoint.

Figure 4:
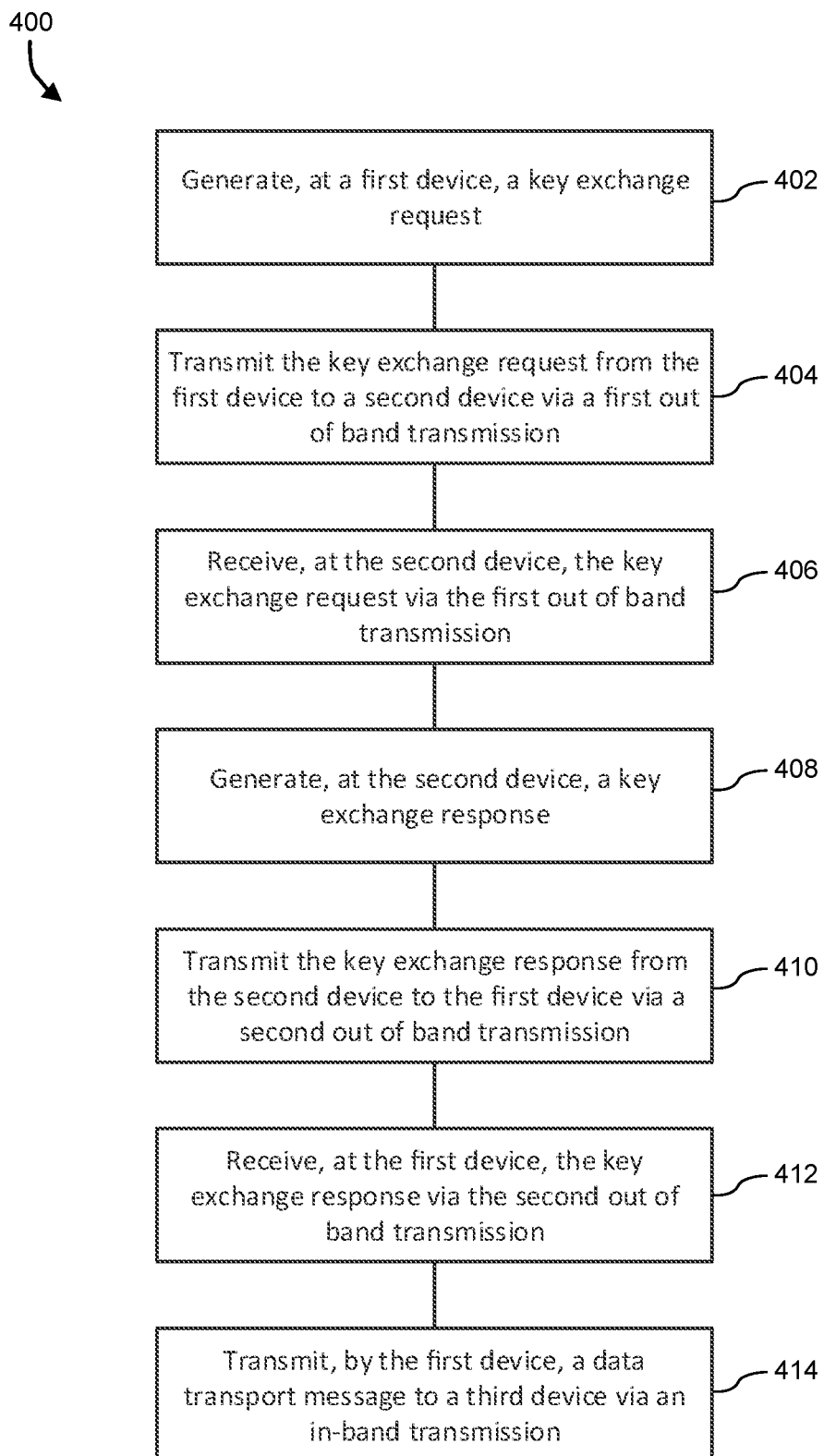
FIG. 4 is a flow chart of a method according to an embodiment of the disclosure.

Turning now to FIG. 4, a method 400 is described. In some examples, the method 400 is a method of out of band key exchange. The out of band key exchange may be performed via a physical interface, or a communication band, protocol, or process, other than that in which subsequent data transport messages are transmitted. In some examples, the out of band key exchange is performed by at least some components of the communication system 10, such as scatter networking nodes.

At operation 402, a first device generates a key exchange request. In some examples, the key exchange request is as described above with respect to the various figures herein. In some examples, the first device encrypts the key exchange request, such as to form a PURB. Encrypting the key exchange request may cause data of the key exchange request to be indistinguishable from uniform random noise. In some examples, before or after the encrypting, the key exchange request may be padded with dummy data to obfuscate a true length of the key exchange request.

At operation 404, the first device transmits the key exchange request to a second device via a first out of band transmission. The first out of band transmission may be performed via a physical interface or communication band, protocol, or process other than a communication channel according to which data transport messages are transmitted. For example, the first out of band transmission may be embedded via steganography into a more ubiquitous data element that is unrelated to key exchange, and that data element may be transmitted via an out of band transmission. In some examples, the key exchange request is encrypted asynchronously based on a static private key of the first device and/or a static public key of the second device.

At operation 406, a second device receives the key exchange request via the first out of band transmission. The second device decrypts the key exchange request via an asynchronous decryption based on a static private key of the second device and/or a static public key of the first device. The second device may further authenticate that the key exchange request was received from a permitted or authorized client. Responsive to determining that the key exchange request is authenticated, the second device may further process the key exchange request, such as described above herein. The second device may also generate a shared secret based at least in part on contents of the key exchange request, such as by generating a Diffie-Hellman shared secret according to a combination of available static and ephemeral keys of the first device and the second device.

At operation 408, the second device generates a key exchange response. In some examples, the key exchange response is as described above with respect to the various figures herein. In some examples, the second device encrypts the key exchange response, such as to form a PURB. Encrypting the key exchange response may cause data of the key exchange response to be indistinguishable from uniform random noise. In some examples, before or after the encrypting, the key exchange response may be padded with dummy data to obfuscate a true length of the key exchange response.

At operation 410, the second device transmits the key exchange response to the first device via a second out of band transmission. The second out of band transmission may be performed via a same physical interface or communication band, protocol, or process as the first out of band transmission, or via a different physical interface, communication band, protocol, or process than the first out of band transmission. In some examples, the key exchange response is encrypted asynchronously based on the static private key of the second device and/or the static public key of the first device.

At operation 412, the first device receives the key exchange response via the second out of band transmission. The first device decrypts the key exchange response via an asynchronous decryption based on the static private key of the first device and/or the static public key of the second device. The first device may further authenticate that the key exchange response was received from the second device. Responsive to determining that the key exchange response is authenticated, the first device may further process the key exchange response, such as described above herein. The first device may also generate a shared secret based at least in part on contents of the key exchange response, such as by generating a Diffie-Hellman shared secret according to an ephemeral public key of the second device included in the key exchange response and a private key of the first device.

At operation 414, the first device transmits a data transport message (or another authenticated message) to a third device via an in-band transmission. In some examples, the in-band transmission is performed via a different physical interface, communication band, protocol, or process than the first and second out of band transmissions. In some examples, the data transport message is encrypted according to the Diffie-Hellman shared secret generated at operation 412. In some examples, encrypting the data transport message causes the data transport message, or at least a portion of the data transport message, to become indistinguishable from uniform random noise (e.g., at least a portion of the data transport message becomes a PURB).

Figure 5:
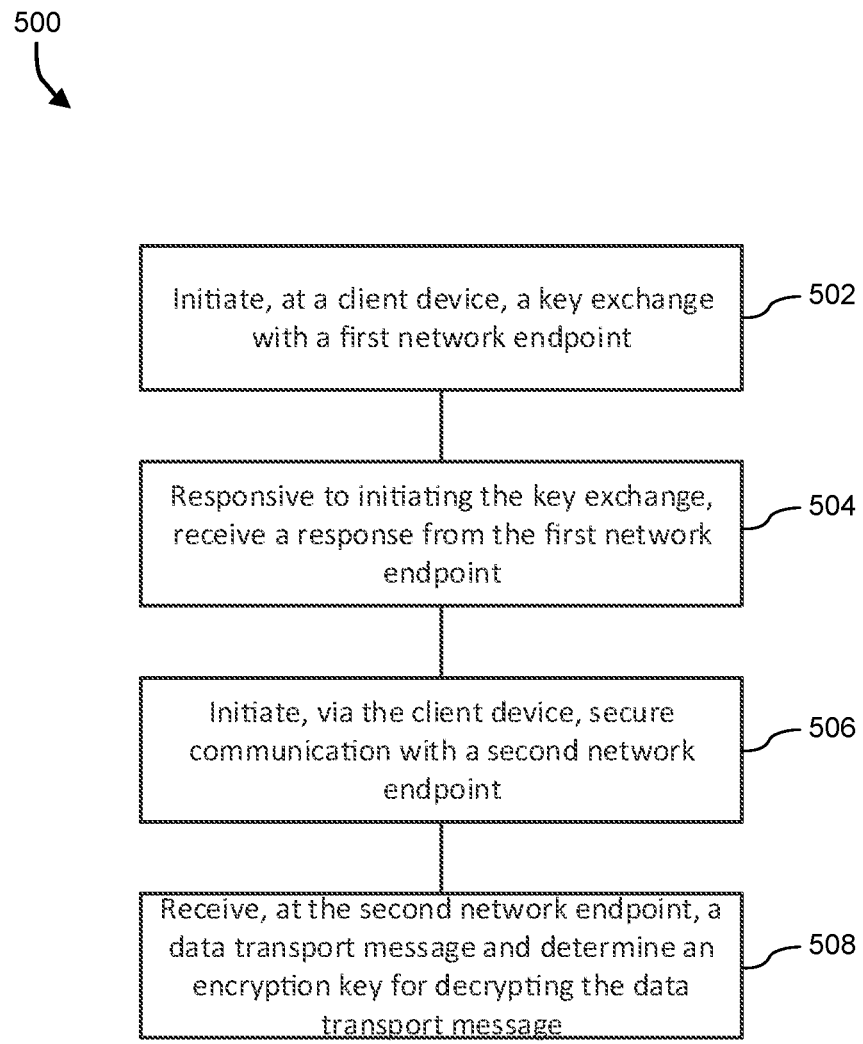
FIG. 5 is a flow chart of a method according to an embodiment of the disclosure.

Turning now to FIG. 5, a method 500 is described. In some examples, the method 500 is a method of identifying a sending device for a received data message. For example, some data messages may be encrypted such that they do not include discernable metadata or identifying payload information. In some examples, before decrypting the data message. In a synchronous encryption system, the receiving device may need knowledge of the sending device to select an appropriate shared secret or synchronous encryption key for decrypting the data message. In some examples, the out of band key exchange is performed by at least some components of the communication system 10, such as scatter networking nodes.

At operation 502, a client device initiates a key exchange with a first network endpoint. The key exchange may be an out of band key exchange, as described above herein, an in-band key exchange, or any other suitable key exchange. To initiate the key exchange, the client device sends a key exchange request to the first network endpoint. In some embodiments, the key exchange request is as described above herein.

At operation 504, responsive to the client device initiating the key exchange, the client device receives a response from the first network endpoint. In some examples, the response is received out of band, as described above herein. In other examples, the response is received in-band, or according to any other suitable process. In an example, the response is a key exchange response, as described above herein. The response includes at least some EVTs. In some examples, the response includes a single EVT, which may be single-use, reusable, or timed-use (e.g., having an expiration time occurring after a specified amount of time has elapsed since its generation, expiring at a specified day and time, expiring after a specified amount of time has elapsed since its first transmission by the client device, expiring after a specified number of uses, etc.). In other examples, the response includes multiple timed-use EVTs. In yet other examples, the response includes a set of single-use EVTs.

At operation 506, the client device initiates secure communication with a second network endpoint. In some examples, the communication may be, or include, a data transport message (or more generally, an authenticated message) transmitted to the second network endpoint by the client device. The data transport message may be synchronously encrypted such that to decrypt the data transport message, a synchronous encryption key shared by the client device and the second network endpoint must be known. However, because the data transport message is encrypted, it may be challenging for the second network endpoint to discern that the client device is the source of the data transport message. As such, the second network endpoint may be unable to select an appropriate synchronous encryption key for decrypting the data transport message, or may be unable to efficiently select such an appropriate synchronous encryption key without a trial and error process. To mitigate this challenge, the client device includes the EVT, or one of the multiple or set of EVTs in the data transport message. The EVT may be located in the data transport message in a known or programmed location, such as at the beginning of the data transport message, at the end of the data transport message, or beginning after a programmed bit of the data transport message that is located somewhere between the beginning and the end of the data transport message.

At operation 508, the second network endpoint receives the data transport message and determines an encryption key for decrypting the data transport message. For example, the second network endpoint reads, extracts, or otherwise obtains the EVT from the data transport message based on the programed location of the EVT. Based on the EVT, the second network endpoint performs a database lookup or otherwise indexes into a datastore storing encryption keys to identify and obtain an encryption key shared with the client. In some examples, the EVT is an encrypted representation of a client identifier which identifies the client device. The second network endpoint may decrypt the encrypted EVT to determine the client identifier directly without performing a database lookup. The second network endpoints subsequently decrypts the data transport message based on the obtained encryption key.

Figure 6:
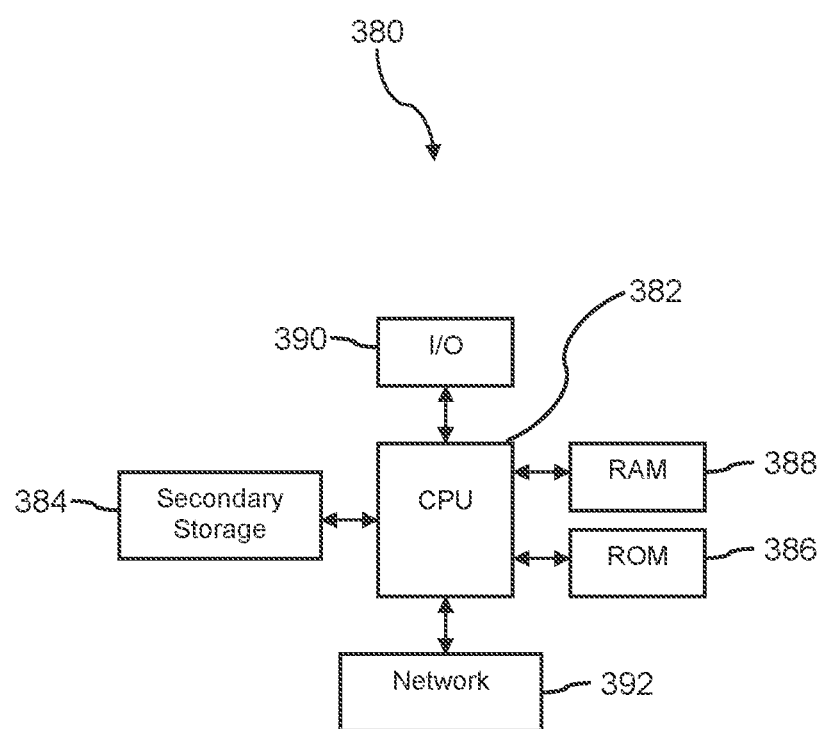
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, RAM 388, input/output (I/O) devices 390, and network connectivity devices 392. The processor 382 may be implemented as one or more CPU chips and/or may me a multi-core processor.

By programming and/or loading executable instructions onto the computer system 380, at least one of the CPU 382, the RAM 388, and the ROM 386 are changed, transforming the computer system 380 in part into a particular machine or apparatus having the functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions which comprise the application. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that comprise the application. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the functionality taught by the present disclosure. When the CPU 382 is configured in this way by the application, the CPU 382 becomes a specific purpose computer or a specific purpose machine.

The secondary storage 384 typically comprises one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may be referred to as physical interfaces or physical network interfaces. The network connectivity devices 392 may take the form of modems, modem banks, Ethernet cards, universal serial bus (USB) interface cards, serial interfaces, token ring cards, fiber distributed data interface (FDDI) cards, WLAN cards such as a WiFi physical interface, radio transceiver cards such as a WWAN (e.g., a cellular network physical interface), and/or other network devices. A network connectivity device 392 may comprise an Ethernet-to-satellite wireless link physical interface. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as CDMA, GSM, LTE, WiFi (IEEE 802.11), Bluetooth, Zigbee, NB IoT, NFC, RFID. The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and transmitted to the network, for example, in the form of a computer data baseband signal or signal embodied in a carrier wave. The baseband signal or signal embodied in the carrier wave, or other types of signals currently used or hereafter developed, may be generated according to any suitable methods. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392.

While only one processor 382 is shown, multiple processors or processor cores may be present. Thus, while instructions may be discussed as executed by a processor, the instructions may be executed simultaneously, serially, or otherwise executed by one or multiple processors or processor cores. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A scatter network device, comprising:
   a non-transitory memory;
   at least one processor; and
   a key exchange application stored in the non-transitory memory that, when executed by the at least one processor:
   generates a key exchange request;
   transmits the key exchange request to a first network endpoint via a first communication band;
   responsive to transmitting the key exchange request, receives a key exchange response, wherein the key exchange response includes one or more endpoint validation tokens uniquely identifying the scatter network device;
   generates a symmetric encryption key based on the key exchange response; and
   transmits an authenticated message encrypted via the symmetric encryption key to a second network endpoint via a second communication band, wherein the first communication band and the second band communication are different communication bands.

2. The scatter network device of claim 1, wherein the key exchange request and the key exchange response are asymmetrically encrypted.

3. The scatter network device of claim 2, wherein the asymmetric encryption of the key exchange request creates a padded uniform random blob.

4. The scatter network device of claim 2, wherein the asymmetric encryption of the key exchange response creates a padded uniform random blob.

5. The scatter network device of claim 1, wherein the symmetric encryption of the authenticated message creates a padded uniform random blob, and wherein executing the key exchange application further causes the processor to concatenate the authenticated message with one of the one or more endpoint validation tokens.

6. The scatter network device of claim 1, wherein the first communication band is a resource constrained communication protocol.

7. A method of secure data routing, comprising:
   receiving, at a first network endpoint, a key exchange request from a client device, the key exchange request being encrypted and including an identifier of the client device and an ephemeral public encryption key of the client device;
   decrypting the key exchange request according to a private encryption key of the first network endpoint;
   generating a key exchange response, the key exchange response including an ephemeral public encryption key of the first network endpoint and encrypted according to the ephemeral public encryption key of the client device, wherein the generating the key exchange response comprises:
      generating one or more endpoint validation tokens; and
      associating the one or more endpoint validation tokens with the identifier of the client device, wherein the key exchange response includes the one or more endpoint validation tokens;
   transmitting, to the client device, the key exchange response, wherein the key exchange request is received via a first communication band;
   generating a shared encryption key based on the private encryption key of the first network endpoint and the ephemeral public encryption key of the client;
   storing the shared encryption key with an association to the identifier of the client device in a data store;
   receiving, at a second network endpoint via a second communication band, an authenticated message from the client device, the authenticated message being symmetrically encrypted, wherein the first communication band and the second communication band are different communication bands; and
   decrypting the authenticated message according to the shared encryption key.

8. The method of claim 7, wherein the key exchange request is asymmetrically encrypted according to a static public key of the first network endpoint and a private key of the client device, and wherein the key exchange response is asymmetrically encrypted according to a static public key of the client device and the private key of the first network endpoint.

9. The method of claim 7, wherein the key exchange response is transmitted via the first communication band.

10. The method of claim 7, wherein the key exchange response is transmitted via a third communication band.

11. The method of claim 7, further comprising establishing, by the second network endpoint, a secure tunnel with the client device through the second communication band based on the authenticated message.

12. A computing device, comprising:
- a non-transitory memory;
- at least one processor; and
- a key exchange application stored in the non-transitory memory that, when executed by the at least one processor:
  - receives an asymmetrically encrypted key exchange request from a client device, the asymmetrically encrypted key exchange request including an identifier of the client device and encrypted according to a static public key of the computing device;
  - decrypts the asymmetrically encrypted key exchange request according to a private encryption key of the computing device to obtain the identifier of the client device;
  - generate one or more endpoint validation tokens uniquely identifying the client device;
  - store the endpoint validation tokens with an association to the client device;
  - generate an asymmetrically encrypted key exchange response, the asymmetrically encrypted key exchange response encrypted according to a static public key of the client device and including the one or more endpoint validation tokens;
  - transmits the asymmetrically encrypted key exchange response to the client device; and
  - generates a symmetric encryption key according to the static public key of the client device and a private key of the computing device, wherein the asymmetrically encrypted key exchange request is received from the client device via a communication band other than a second and different communication band over which the client device transmits authenticated messages which are authenticated according to the symmetric encryption key.

13. The computing device of claim 12, wherein executing the key exchange application further causes the processor to store the symmetric encryption key in a data store with an association to the client device.

14. The computing device of claim 12, wherein the asymmetrically encrypted key exchange request is received from the client device via a bandwidth constrained communication protocol.

15. The computing device of claim 12, wherein the computing device
- receives a symmetrically encrypted authenticated message from the client device via the second communication band; and
- decrypts the symmetrically encrypted authenticated message according to the symmetric encryption key.

* * * * *